(12) United States Patent
Guise et al.

(10) Patent No.: US 7,472,927 B2
(45) Date of Patent: Jan. 6, 2009

(54) TUBULAR MEMBER HAVING AN ANTI-GALLING COATING

(75) Inventors: Richard J. Guise, Lowestoft (GB); Michael G. Edwards, Lowestoft (GB)

(73) Assignees: Hunting Oilfield Services (UK) Ltd., Portlethen (GB); M.P. Eastern Limited, Suffolk (GB)

( * ) Notice: Subject to any disclaimer, the term of this patent is extended or adjusted under 35 U.S.C. 154(b) by 347 days.

(21) Appl. No.: 10/499,796

(22) PCT Filed: Dec. 20, 2002

(86) PCT No.: PCT/GB02/05847

§ 371 (c)(1),
(2), (4) Date: Jan. 6, 2005

(87) PCT Pub. No.: WO03/060198

PCT Pub. Date: Jul. 24, 2003

(65) Prior Publication Data

US 2005/0118364 A1    Jun. 2, 2005

(30) Foreign Application Priority Data

Dec. 24, 2001    (GB)    .................... 0130967.3

(51) Int. Cl.
*F16L 15/00* (2006.01)
*C22C 9/02* (2006.01)
*C22C 13/00* (2006.01)

(52) U.S. Cl. .................... 285/55; 285/94; 285/333; 285/355; 285/390; 420/470; 420/560; 428/36.9; 148/433

(58) Field of Classification Search .................... None
See application file for complete search history.

(56) References Cited

U.S. PATENT DOCUMENTS

| | | | | |
|---|---|---|---|---|
| 2,798,140 | A | * | 7/1957 | Kohring .................... 338/137 |
| 3,956,533 | A | * | 5/1976 | Weber et al. ................ 427/236 |
| 4,331,580 | A | | 5/1982 | Bunyan |
| 4,410,644 | A | | 10/1983 | Bunyan |
| 4,468,309 | A | * | 8/1984 | White ........................ 427/528 |
| 4,474,651 | A | | 10/1984 | Yauchi et al. |
| 4,527,815 | A | | 7/1985 | Frick |

(Continued)

FOREIGN PATENT DOCUMENTS

EP    0264446 A1    4/1988

(Continued)

OTHER PUBLICATIONS

International Search Report of PCT/GB 02/05847, May 23, 2003, 3 pgs.

(Continued)

*Primary Examiner*—James M Hewitt
(74) *Attorney, Agent, or Firm*—Conley Rose, P.C.; Rodney B. Carroll

(57) ABSTRACT

A tubular member 12 having an internal and/or external metal thread 18, 20 at one end thereof, at least part of the thread 18, 20 being coated with an alloy of copper and tin, said alloy containing 5 wt % to 95 wt % copper. The tubular member 10 can be combined with another tubular member 14, 16 to provide a threaded connection 10 having improved galling resistance.

50 Claims, 4 Drawing Sheets

U.S. PATENT DOCUMENTS

| | | | |
|---|---|---|---|
| 4,630,849 A * | 12/1986 | Fukui et al. | 285/55 |
| 4,692,988 A * | 9/1987 | Shulver et al. | 29/458 |
| 4,758,025 A | 7/1988 | Frick | |
| 4,871,194 A * | 10/1989 | Kawashima et al. | 285/55 |
| 4,872,515 A | 10/1989 | Lundell | |
| 5,064,004 A | 11/1991 | Lundell | |
| 5,069,761 A * | 12/1991 | Krings et al. | 205/183 |
| 5,253,902 A | 10/1993 | Petelot | |
| 5,298,336 A | 3/1994 | Tanaka et al. | |
| 5,346,668 A | 9/1994 | Tanaka et al. | |
| 5,360,239 A * | 11/1994 | Klementich | 285/94 |
| 5,413,756 A | 5/1995 | Sahu | |
| 5,482,782 A | 1/1996 | Tanaka et al. | |
| 5,536,422 A | 7/1996 | Oldiges et al. | |
| 5,649,725 A * | 7/1997 | Nagasaku et al. | 285/334 |
| 6,027,145 A * | 2/2000 | Tsuru et al. | 285/94 |
| 6,305,723 B1 | 10/2001 | Schutz et al. | |
| 6,387,110 B1 * | 5/2002 | Drucker et al. | 606/170 |
| 6,659,509 B2 * | 12/2003 | Goto et al. | 285/94 |
| 6,679,526 B2 * | 1/2004 | Yamamoto et al. | 285/55 |
| 6,746,057 B2 * | 6/2004 | Goto et al. | 285/333 |
| 6,827,996 B2 * | 12/2004 | Goto | 428/36.9 |
| 6,869,111 B2 * | 3/2005 | Goto et al. | 285/333 |
| 6,933,264 B2 * | 8/2005 | Petelot | 508/318 |
| 2003/0094810 A1 * | 5/2003 | Goto et al. | 285/94 |
| 2003/0111838 A1 * | 6/2003 | Goto et al. | 285/94 |
| 2003/0159764 A1 * | 8/2003 | Goto | 148/519 |
| 2003/0160446 A1 * | 8/2003 | Goto et al. | 285/94 |
| 2004/0195826 A1 * | 10/2004 | Goto | 285/94 |

FOREIGN PATENT DOCUMENTS

| | | |
|---|---|---|
| EP | 0157587 B1 | 4/1989 |
| EP | 0292998 B1 | 8/1990 |
| EP | 0264446 B1 | 5/1991 |
| EP | 0632225 A1 | 1/1995 |
| EP | 0632225 B1 | 8/1997 |
| GB | 525364 | 10/1939 |
| GB | 2104919 A | 3/1983 |
| GB | 2104919 B | 8/1985 |
| GB | 2118205 B | 8/1985 |
| GB | 2195939 A | 4/1988 |
| GB | 2195728 B | 11/1990 |
| GB | 2195939 B | 11/1990 |
| GB | 2230311 B | 1/1991 |
| GB | 2223552 B | 7/1992 |
| JP | 60116796 A | 6/1985 |
| JP | 61079798 A | 4/1986 |
| JP | 2027088 A | 1/1990 |
| WO | WO 01/65058 A1 | 9/2001 |
| WO | WO 01/65059 A1 | 9/2001 |

OTHER PUBLICATIONS

Verlag, G.T., 10th Edition: "Römpp-Lexikon Chemie," (Information on the definition of Bronze), XP-002242037, p. 529.

* cited by examiner

US 7,472,927 B2

TUBULAR MEMBER HAVING AN ANTI-GALLING COATING

CROSS-REFERENCE TO RELATED APPLICATIONS

This application is a filing under 35 U.S.C. 371 of International Application No. PCT/GB02/05847 filed 20 Dec. 2002, entitled "A Tubular Member Having An Anti-Galling Coating," claiming priority of Great Britain Patent Application 0130967.3 filed 24 Dec. 2001, which applications are incorporated by reference herein in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a tubular member having an anti-galling coating. The invention also relates to an alloy, which is suitable for use as an anti-galling thread coating for metal-metal contact points.

BACKGROUND OF THE INVENTION

Galling is a severe form of scuffing associated with gross damage to the mating surfaces the result of which is material transfer and seizure and is typically experienced in situations with the following:

(a) high metallurgical compatibility of mating surfaces (similar material compositions)
 (b) high loadings between the surfaces Metal to metal contact points, and in particular threaded metal-metal contact points may be subject to galling during the making and subsequent breaking of the joint. In the oil industry, metal-metal connections, such as those between the individual pipe connections in completion strings, often require threaded metal-metal joints to be formed, which must withstand high temperatures and pressures, both internal and external, whilst remaining sealed. These seals must be easy to assemble and disassemble, for ease of use and safety. It is known to use anti-seize compounds to prevent galling, which operate by placing a dissimilar metal, such as copper, or metal-containing film between two similar metal surfaces. The dissimilar film thereby prevents the surfaces contacting directly, which could lead to fusion of the connection. Fused downhole connections could lead to failure of the tubing, and at the very least, galling and wear of the connection when it is dismantled.

In the past, in the oil industry, drilling operations have used an oilfield thread compound (also known as "thread dope" or "dope"), which is a grease/lubricant that has been formulated in accordance with American Petroleum Industry (API) bulletin 5A3. This compound is a substance that is applied to threaded oil field pipe connections, to provide lubrication during assembly and disassembly, and further to aid in sealing against the high internal and external pressures. As an example, the female mating component of steel alloy with a chromium content of greater than or equal to 9% is copper plated, and the dope is applied prior to make-up, of the connection. Such doping compounds typically contain heavy metals, such as antimony and lead, which can be toxic and harmful to the environment.

Legislation in certain countries, particularly in Europe, requires that only environmentally friendly lubricants should be used for oil and gas activity. Additionally, in Europe, there is a goal of achieving zero emission in oil field installations. Furthermore, it is likely that such legislation will spread to other countries, such as the United States of America, as environmental issues regarding oil exploration become more prominent. Environmentally friendly lubricants do exist (see for instance U.S. Pat. No. 5,536,422), but it is questionable whether they are as effective as the traditional, heavy metal-based systems.

Current API and API-modified dopes are not user friendly. They are difficult to apply evenly around the threaded surface areas, and are extremely difficult to remove from skin and work overalls. Due to the difficulties in applying such dopes (they are "thick" and tacky), they also tend to be used in quantities that generate significant amounts of waste. During the assembly of each connection, excess dope is forced into the bore of the pipe, and onto the external surface of the pipe. The longer the pipestring, the more connections are required, and therefore the more dope is forced into the pipestring, increasing the risk of well contamination. External surplus dope becomes a serious slip and contamination hazard, which is dangerous to those working in and around such areas. Such pipes can be several miles in length, so there can be a considerable amount of waste dope internally and externally.

GB2195939A relates to an extension drill rod for percussion drilling machines. The drill rod includes a wear lining in the form of a layer which may be copper bronze, aluminium bronze or another material softer than steel. The main reason for the choice of these materials is their softness relative to steel. The purpose of this coating is to combat fretting wear or erosion during use. There is no disclosure of the composition of the bronze, but given the requirement for a soft coating, it is to be expected that the coating would be high in copper or tin content.

It is known to provide a metal-to-metal sealing portion on tubular joints. It is also known for such sealing portions to include a coating. The joints may also include a threaded portion which has been coated. In GB2104919A there is described a coating which comprises a first activating layer and a second electrodeposited layer. The electrodeposited layer may be a layer of metal selected from the group consisting of iron, copper, zinc, chromium, nickel or an alloy containing at least one of these metals. There is, however, no indication that any one of these metals or alloys provides superior anti-galling properties.

SUMMARY OF THE INVENTION

It is an object of this invention to provide an improved metal-metal seal connection, which is free of environmentally harmful grease. It is a further object of the invention to provide a coating for threaded metal-metal connections, which does not require any lubricant to be applied between the threads.

DETAILED DESCRIPTION OF THE INVENTION

Figure 1:
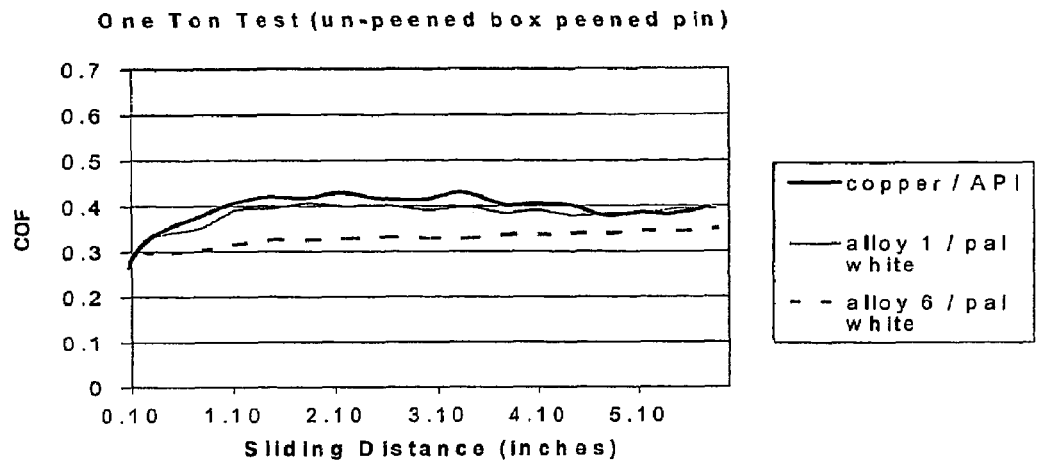
FIGS. 1-6 are graphs illustrating the results of coefficient of friction (COF) testing.
Figure 2:
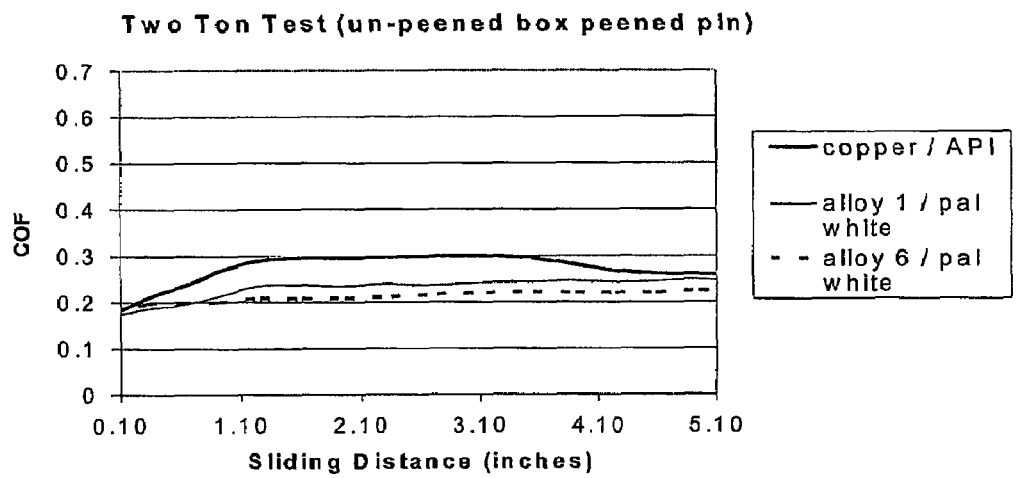
Figure 3:
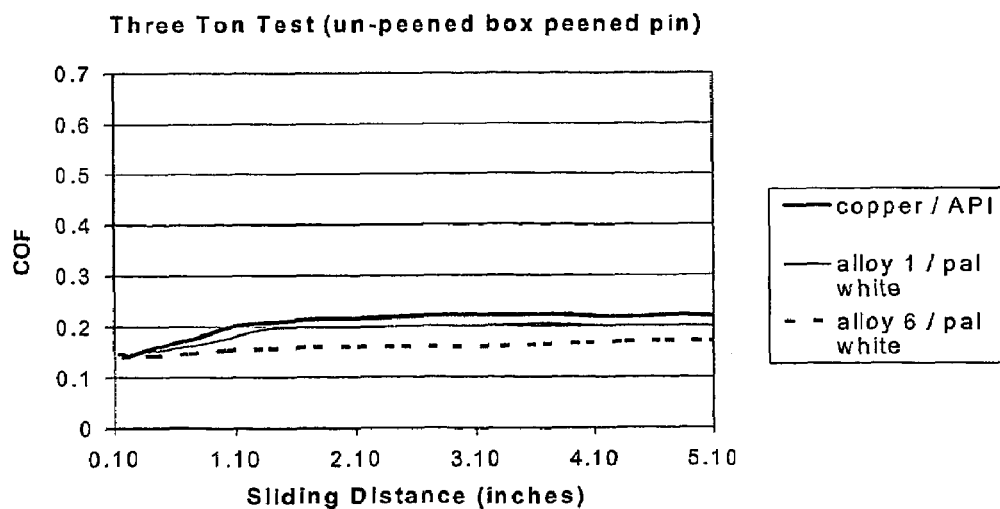
Figure 4:
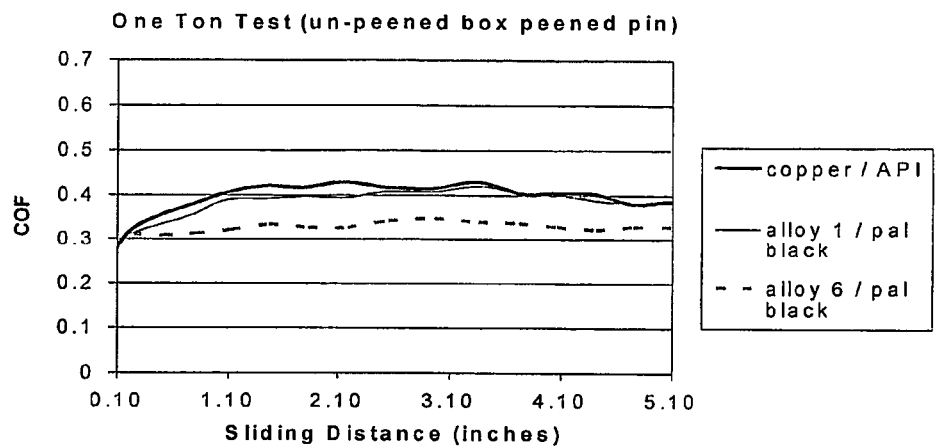
Figure 5:
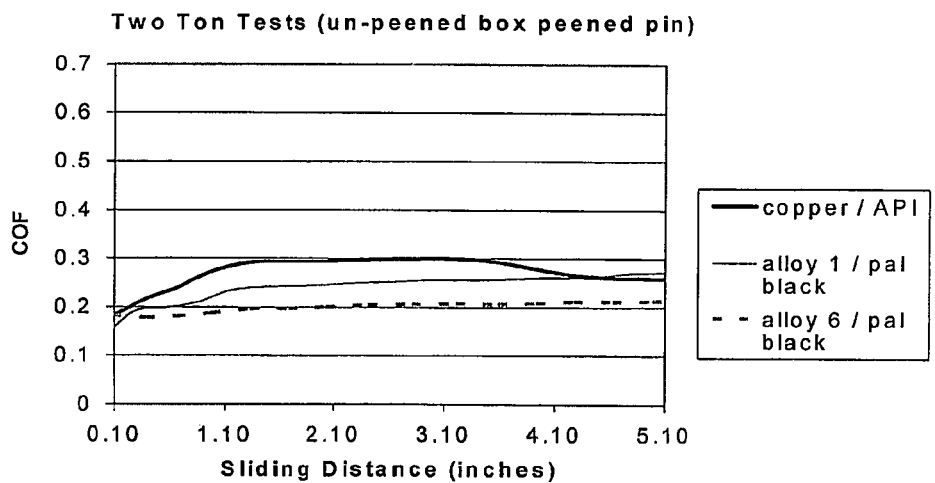
Figure 6:
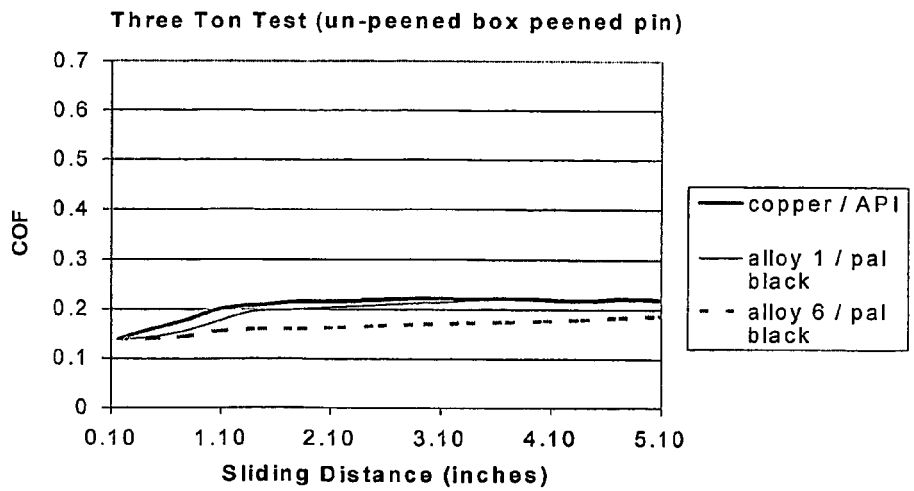

According to one aspect of the invention there is provided a tubular member having an internal and/or external metal thread at one end thereof, at least part of the thread being coated with an alloy of copper and tin, said alloy preferably contains 5 to 95 wt %.

It is preferred that the lower limit for the copper content is 10 wt % copper, more preferably 20 wt % copper, still more preferably 25 wt % copper. Most preferably there is at least 35 wt % or even at least 40 wt % copper.

The upper limit for the copper content is desirably 95 wt %. It is preferred that the upper limit is 90 wt %, more preferably 85 wt %, still more preferably 80 wt %, and still more preferably 70 wt %. Most preferably the upper limit for the copper content is 60 wt %, or even 55 wt %, It is particularly preferred that the alloy comprises 20-80 wt % copper, more preferably 25-70 wt % copper, still more preferably 30-70 wt % copper. In the most advantageous embodiments, the alloy comprises 35-60 wt % copper, more preferably 40-55 wt % copper. The remainder of the alloy comprises tin, and, optionally, a few percent, such as up to 2 wt %, of additives or impurities.

Alloys comprising around 7-20 wt % tin are typically known as red/yellow bronzes. White bronze typically comprises about 45-55 wt % tin, and is also known as speculum. In one preferred embodiment, the alloy comprises white bronze, and therefore comprises about 45-55 wt % copper.

Advantageously, the coating has a thickness of from 5 to 25 microns (or between 5-25 microns).

The tubular member is preferably a component of oil or gas production equipment. Examples of oil or gas production equipment with which the invention can, with advantage, be used, include: production flow couplings; blast joints; landing nipples; circulating devices; safety valves; mandrels; travel joints; production packers; hangers; and cross over joints.

It is envisaged that the alloy coating may be used in joints in oil drilling machinery, and the metal-metal contact surfaces are the threaded surfaces of interconnecting oil production equipment. In particular, it is preferred that the anti-galling coating will be applied to interconnecting threaded surfaces of individual lengths of tubing string, for downhole use.

The tubular member may also be used in water productions (including geothermal water production) and in other uses of conduit tubing or structural tubular members.

The tubular member is preferably stainless steel. High chrome steels, such as martensitic, austenitic and duplex stainless steels, are particularly preferred. The tubular member is preferably a steel with a chromium content of greater than or equal to 8.5 wt %, preferably greater than or equal to 9 wt %.

In an embodiment, the tubular member may be a carbon steel, or may be another metal, such as titanium, nickel and alloys thereof.

The precise disposition of the threads can be varied substantially. Thus, the tubular member may have an internal thread, or an external thread, at just one end thereof. The tubular member may have an internal thread at both ends, or an external thread at both ends. It is also possible for the tubular member to have internal and external threads at both ends. Another arrangement involves an internal thread at one end and an external thread at the other end.

It will be clear that the tubular member can be connected to other threaded tubular members in a large number of different ways depending on the arrangement of the threads.

One common arrangement is a joint arrangement where the tubular member has an internal or external thread at one end which can be connected to an external or internal thread respectively at the end of the other tubular member. This box and pin arrangement (the internally threaded member being the box, and the externally threaded member being the pin) is known as an integral joint.

Another common arrangement is known as a coupling. In this arrangement, both ends of the tubular member are internally or externally threaded, whereby another tubular member can be connected to each end of the coupling member. In this arrangement, it is preferred that the coupling member is provided with internal threads at each end thereof.

The copper/tin coating can be provided on the threads of both the tubular members, but this is not usually essentially. In fact, it is usually preferred that the threads of only one of the tubular members are coated. In general, it is preferred that internal threads of the tubular member are coated, and that external threads are not coated.

Thus, when the tubular member is provided as a coupling member, the threads of the tubular member can be provided with the coating, but the threads of the members which connect to the coupling member would not usually be coated.

The invention is especially concerned with threaded premium connections. Such connections provide gas leak tightness, joint strength, corrosion resistance, and make and break capabilities, and operate efficiently in carbon steels, high chrome and other alloys. In particular, premium connections involve the presence of a torque shoulder and a registration member, which is usually called a central register.

Therefore, in a particularly preferred embodiment, the tubular member is provided with a torque shoulder, the torque shoulder being adapted to engage against the torque shoulder of another tubular member so as to apply a torque as the threads are tightened. This enables the connection to be preloaded.

In another particularly preferred embodiment, the tubular member includes a seal, the seal being adapted to engage against a corresponding seal on another tubular member when the members are connected, whereby a gas tight seal is provided between the tubular members. Preferably each seal is metal, whereby the gas tight seal is a metal-to-metal seal.

The alloy coating preferably extends at least partially over the or each seal.

It will be appreciated that the tubular member need not necessarily be hollow inside, i.e., it may be a solid tubular member. When the tubular member is not hollow, the threads would be provided on the exterior surface.

The alloy coating improves galling resistance to the extent that it is not necessary to use a lubricant. It is, however, possible for an environmentally friendly lubricant to be used, such as a PTFE or a graphite lubricant, in conjunction with the alloy coating, in order to decrease friction during assembly and disassembly of the contacted surfaces. Alternatively, a traditional dope may be used in conjunction with the alloy coating. When used, the lubricant is preferably applied during the assembly of the connection. Preferably the lubricant is applied onto one or both of the contact surfaces. The lubricant may be applied by any known method of application, such as spraying or painting.

The invention provides an environmentally friendly solution to the problems of the prior art. The ability to dispense with the lubricants, especially the older API lubricants, results in reduced pollution, reduced risk of fouling wirelines, fewer health and safety risks, reduced well contamination and reduced waste disposal problems. From an operational point of view, the invention is much simpler to operate than prior art techniques. In addition, the invention improves the overall corrosion resistance of the threaded couplings.

According to another aspect of the invention, there is provided the use of an alloy comprising copper and tin, for increasing the galling resistance of metal-metal contact surfaces, preferably metal-metal galling surfaces. Preferably a coating of the alloy is applied to the threaded surface of at least one of the contact surfaces. It is possible, however, to apply the anti-galling coating to more than one of the contact surfaces. The coating may have the features of the coating described above.

According to another aspect of the invention, there is provided an anti-galling coating for threaded metal-metal contact surfaces, comprising an alloy of copper and tin.

According to another aspect of the invention there is provided a tubular member which includes a metal seal, the seal being adapted to engage against a corresponding seal on another tubular member when the members are connected, whereby a metal-to-metal gas tight seal is provided between the tubular members, wherein the metal seal is coated with a copper/tin alloy as described above.

In all embodiments of the invention, an undercoat would usually be provided between the coating and the material of the threaded member. This undercoat serves the purpose of helping the coating to adhere to the threaded member, and is commonly referred to as an "activation layer" or a "striking layer". The undercoat is typically nickel, but other materials, such as iron, copper, zinc, manganese, chromium, cobalt or an alloy thereof, may be used in addition or instead.

The alloy is preferably applied by electroplating. The electro-deposition of copper/tin alloys is known in the art (see for instance GB 525364). The alloy may be deposited from a cyanide-based bath. Suitable plating baths include, for instance, baths based on copper cyanide/sodium stannate, copper cyanide/potassium stannate, copper cyanide/potassium pyrophosphate/stannous sulphate, copper cyanide/tin phosphate, copper cyanide/tin sulphide or copper cyanide oxalate. Alternatively the plating bath may be an alkaline bath, such as a tartrate or pyrophosphate bath, or an acid bath, such as an oxalate, fluoroborate or sulphate bath. It is also possible to plate the coating using inert anodes, and altering bath parameters to suit requirements. The coating composition can be altered by methods known in the art, such as adjusting bath temperature and current density applied, and bath composition.

References to quantities in terms of percentages in this application refer to the percentage of the component by weight, unless stated otherwise.

The invention will be further described with reference to the following examples. The sample coating was applied to the female threaded surface of OCTG (Oil Country Tubular Goods) connections by standard electroplating techniques, known to those skilled in the art. The connections were coated using two different cyanide/potassium-based plating baths, the compositions of which are shown in Table 1. Electroplating conditions were as follows: bath temperature between approximately 60° C. and 70° C.; operating cathode current density of approx. 1.0 Amp dM$^{-2}$; anode material copper.

TABLE 1

Electroplating bath compositions

| Solution Type | Description | Nominal gpl | Low Limit gpl | High Limit gpl |
|---|---|---|---|---|
| Solution 1 | Copper metal | 8 | 4 | 12 |
| | Tin metal | 40 | 30 | 50 |
| | Free Potassium cyanide | 15 | 10 | 20 |
| | Free Potassium hydroxide | 7.5 | 5 | 15 |
| Solution 2 | Copper metal | 30 | 20 | 40 |
| | Tin metal | 40 | 30 | 50 |
| | Free Potassium cyanide | 50 | 40 | 60 |
| | Free Potassium hydroxide | 7.5 | 5 | 15 |

(gpl = grams per liter)

The plated connections were then assessed for their galling resistance and their coefficient of friction (COF) (on making and breaking the connection) without the use of a lubricant i.e. dry, on a galling rig. Axial load was applied through a bottle jack, which transmitted force through a load cell. All pressures were measured by a data acquisition system. The characteristics of the various samples are shown in Table 2.

TABLE 2

Coating characteristics

| Sample No. | Nominal Target Composition |
|---|---|
| Solution Type 1 | |
| 1 | 40% Sn |
| 2 | 70% Sn |
| 3 | 80% Sn |
| 4 | 27% Sn |
| Solution Type 2 | |
| 5 | 10% Sn |
| 6 | 25% Sn |
| 7 | 50% Sn |

The Nominal Target Composition value refers to the targeted alloy composition based on the coating composition results. This may vary in practice due, for example, to the component geometry and plating system. Test couplings can be testes for composition by microsectioning and compositional analysis using a scanning electron microscope and EDAX attachment.

Optimum coefficient of friction results were achieved using a lubricant, such as environmentally friendly lubricants e.g. graphite-based and e.g. PTFE-based lubricants. Alloy sample 1, in combination with a PTFE based lubricant, displayed characteristics most closely matched to copper and API-modified dope, although the results for alloy 6 are not entirely without merit. The results of the COF tests are shown in FIGS. 1 to 6, in comparison with alloy 6 and a copper/API joint, with either a PTFE-(FIGS. 1-3) or graphite-based (FIGS. 4-6) lubricant.

Figure 7:
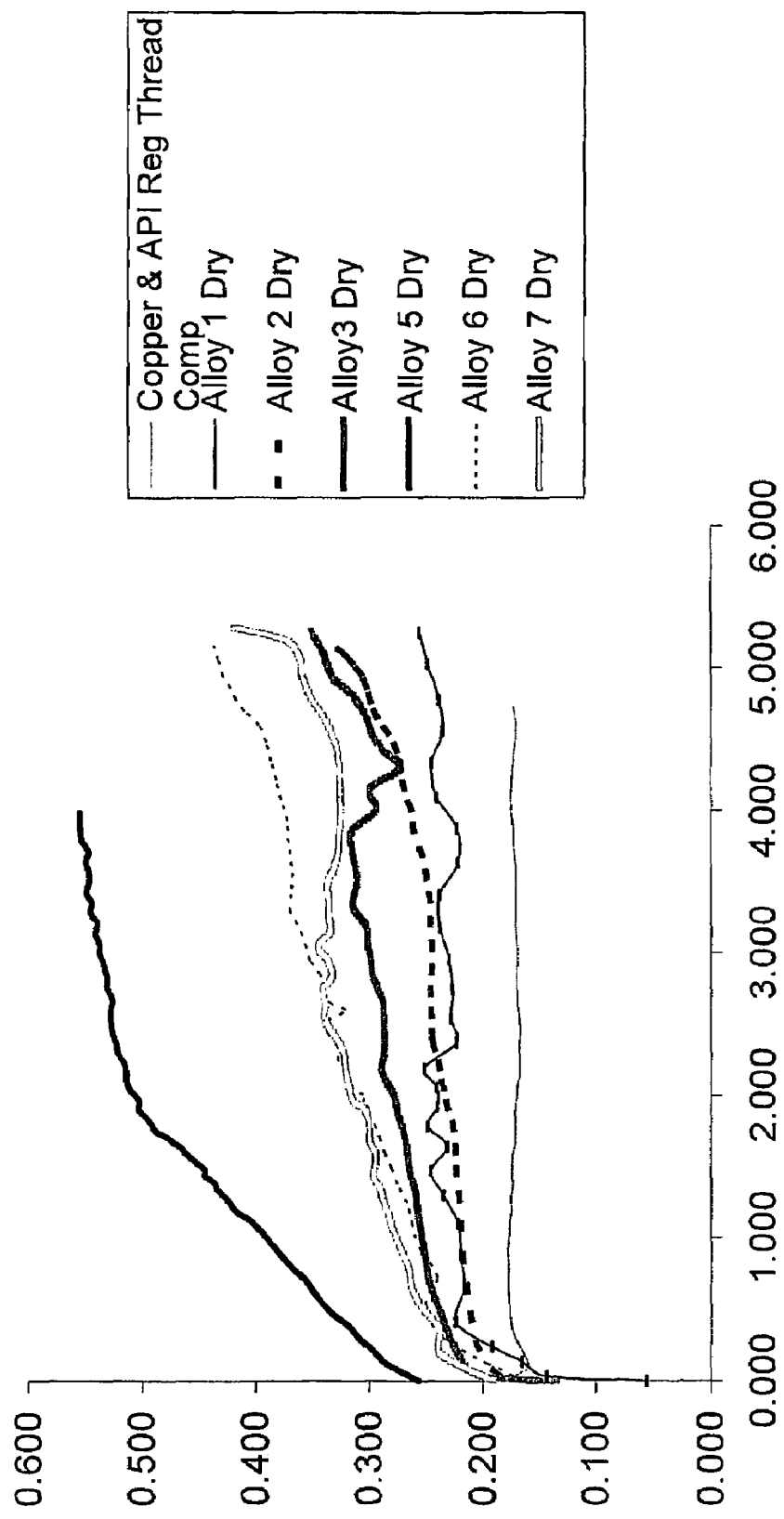
FIG. 7 is a graph illustrating the results of a galling test.

Previous tests indicated that alloy sample 1 also showed the highest resistance to galling, and possesses improved resistance to corrosion, over its constituent metals. In this regard, reference is made to FIG. 7 which shows the results of a galling test. This galling test was carried out from four tons to eight tons axial load. Galling was induced by rotating a 3-inch tapered pin (with two parallel threads) within a box having a coincident internal diameter and taper. The test coupons were rotated at approximately 2-3 RPM. After one complete revolution the load was released and the test coupon removed from the galling rig for inspection. The results show that all the alloy coated metals were able to survive the test without galling, and the performance was close to the results which can be achieved with the traditional (but environmentally unfriendly) dopes. The results show that the alloy coated metals are therefore suitable as a replacement for the traditional API-doped metals. In this regard, it should be noted that the alloys according to the invention were tested entirely without dope. Only the alloy 1 and the control (i.e. the traditional API coated copper coating ) passed the eight ton test, which demonstrates the particular superiority of the alloy 1 composition, and its suitability to particularly demanding conditions.

The following connections/couplings were coated and torque trials carried out using both horizontal and vertical make ups and break outs. No galling was evident after multiple make and break tests were carried out (a supplementary lubricant API Dope Free was applied). Composition analysis was carried out on sectioned couplings using X Ray fluorescence coating analysis techniques, the results of which are shown in Table 3.

TABLE 3

Composition Analysis

| Coupling Size | Cu Wt % | Sn Wt % | Coating Thickness/μm |
|---|---|---|---|
| 5.5" L80 13 Cr | 44.0 | 56.0 | 14.1 |
| 5.5" L80 13 Cr | 39.6 | 60.4 | 8.8 |
| 5.5" KO-HP2 | 39.1 | 60.9 | 13.0 |
| 5.5" KO-HP2 | 65.5 | 34.5 | 5.4 |
| 5.5" L80 13 Cr | 41.9 | 58.1 | 9.1 |
| 5.5" L80 13 Cr | 42.7 | 57.3 | 9.5 |
| 5.5" KO-HP2 | 30.6 | 59.4 | 16.5 |
| 5.5" L80 13 Cr | 47.9 | 52.1 | 7.8 |
| 5.5" KO-HP2 | 47.5 | 52.5 | 12.6 |
| 5.5" L80 13 Cr | 45.7 | 54.3 | 8.6 |

Figure 8:
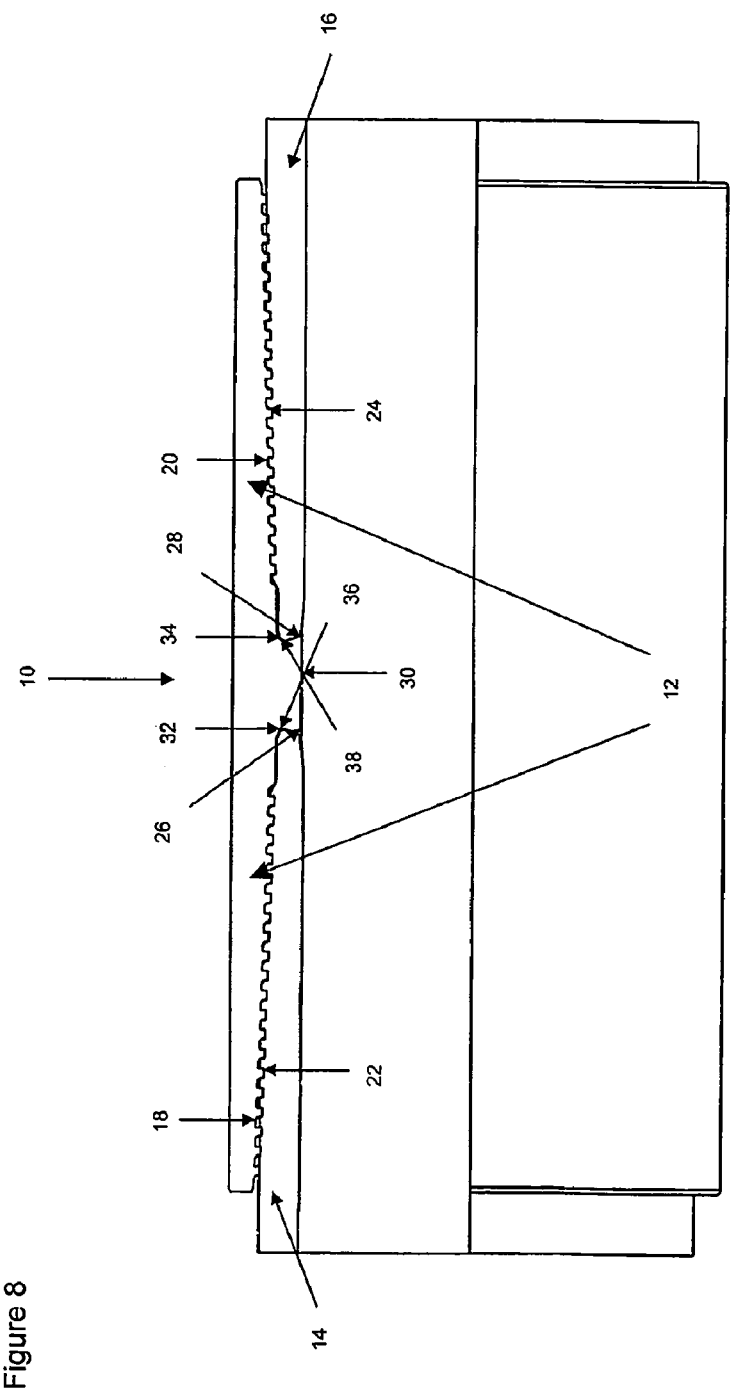
FIG. 8 is a schematic cross-sectional view of one embodiment of a threaded connection.
Figure 9:
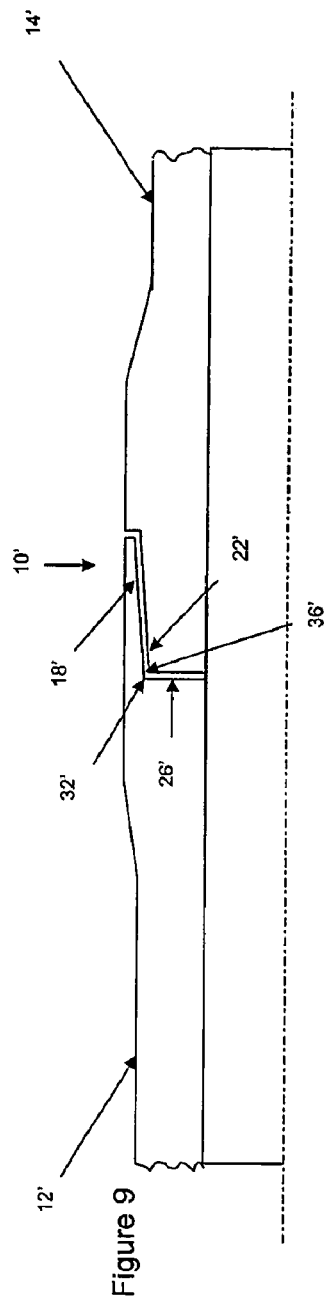
FIG. 9 is a schematic cross-sectional view of another embodiment of a threaded connection.

Reference is now made to FIG. 8 which is a schematic cross-sectional view of one embodiment of a threaded connection according to the invention; and to FIG. 9 which is a schematic cross-sectional view of another embodiment of a threaded connection according to the invention.

In FIG. 8 is a cross-sectional view through one wall of a threaded connection generally designated 10, which comprises a first threaded tubular member 12 (also known as a coupling) connected to two threaded tubular members 14 and 16 (also known as pins). The coupling 12 has threaded interior surfaces 18 and 20 which engage respective threaded exterior surfaces 22 and 24 on the pins 14 and 16. Each of the threaded surfaces 18, 20, 22 and 24 includes an alloy coating as described above.

The coupling 12 is provided with two torque shoulders 26 and 28 each of which is adapted to abut an end of a respective one of the threaded members 14 and 16. As the threads of the coupling 12 and pins 14 and 16 are tightened (or torqued) together, the torque shoulders 26 and 28 abut and slide against the ends of the pins 14 and 16 and preload the connection 10.

The coupling 12 further includes a central register 30 disposed between the torque shoulders 26 and 28. The register 30 serves to keep the pins 14 and 16 spaced at a predetermined and known spacing. The central register also provides a sealing mechanism and provides the connection 10 with the required rigidity.

The interior surface of the coupling 12 includes two metal seals 32 and 34 each of which are adapted to seal against corresponding respective metal seals 36 and 38 provided on the exterior surface of the pins 14 and 16. When in engagement, the metal seals 32, 36 and 34, 38 provide a metal-to-metal gas tight seal.

In FIG. 9 is a cross-sectional view through one wall of a tubular threaded connection generally designated 10', which comprises a first threaded tubular member 12' (also known as a box) connected to a single threaded tubular member 14' (also known as a pin). The box 12' has a threaded interior surface 18' which engages a threaded exterior surface 22' on the pin 14'. Each of the threaded surfaces 18' and 22' includes an alloy coating as described above.

The box 12' is provided with a torque shoulder 26' which is adapted to abut an end of the pin 14'. As the threads of the box 12' and pin 14' are tightened (or torqued) together, the torque shoulders 26' abuts and slides against the end of the pin 14' and preloads the connection 10'.

The interior surface of the box 12' includes a metal seal 32' which is adapted to seal against a corresponding metal seal 36' provided on the exterior surface of the pin 14'. When in engagement, the metal seals 32' and 36' provide a metal-to-metal gas tight seal.

It will be appreciated that the invention described above may be modified. For instance, whilst the description refers to threaded joints, it may also be possible to utilise this invention in non-threaded connections, such as interference connections.

The invention claimed is:

1. A tubular member having:
   an internal metal thread, an external metal thread, or both at one end thereof,
   at least part of the internal metal thread, external metal thread, or both being coated with an alloy of copper and tin for increasing galling resistance of threaded metal-metal contact points,
   said alloy containing 20 wt % to 80 wt % copper, and
   the remainder of the alloy comprising tin and optionally up to 2 wt % additives or impurities.

2. A tubular member according to claim 1, wherein the alloy contains 35 wt % to 60 wt % copper.

3. A tubular member according to claim 1, wherein the alloy contains 40 wt % to 55 wt % copper.

4. A tubular member according to claim 1, wherein the tubular member has a coated internal thread, a coated external thread, or both at each end thereof.

5. A tubular member according to claim 1, which is a component of oil or gas production equipment.

6. A tubular member according to claim 1, which is stainless steel.

7. A tubular member according to claim 1, which contains greater than or equal to 9 wt % chromium.

8. A tubular member according to claim 1, which is austenitic, martensitic or duplex stainless steel.

9. A tubular member according to claim 1, which is carbon steel.

10. A tubular member according to claim 1, wherein the alloy coating has a thickness from 5 to 25 microns.

11. A tubular member according to claim 1, which comprises a threaded connector having a thread at each end thereof, at least part of each thread being coated with said alloy.

12. A tubular member according to claim 11, wherein said threads are internal threads.

13. A tubular member according to claim 12, further comprising a torque shoulder adjacent to each thread.

14. A tubular member according to claim 13, further comprising a central register disposed between the torque shoulders.

15. A tubular member according to claim 1, wherein the alloy prevents galling of at least part of the internal metal thread, the external metal thread, or both.

16. A tubular member according to claim 1, wherein the alloy prevents galling of at least part of the internal metal thread, the external metal thread, or both when breaking a connection with the internal metal thread, external metal thread, or both.

17. A threaded connection comprising:
a first tubular member having an internal metal thread, an external metal thread, or both at one end thereof,
at least part of the internal metal thread, external metal thread, or both being coated with an alloy of copper and tin for increasing galling resistance of threaded metal-metal contact points,
said alloy containing 20 wt % to 80 wt % copper, and
the remainder of the alloy comprising tin and optionally up to 2 wt % additives or impurities; and
a second tubular member, the second tubular member having a threaded end adapted to engage the threaded end of the first tubular member.

18. A threaded connection according to claim 17, wherein the first tubular member includes a torque shoulder adjacent the internal metal thread, external metal thread, or both of the first tubular member, the torque shoulder being adapted to engage with a cooperating torque shoulder on the second tubular member.

19. A threaded connection according to claim 17, wherein each of the first tubular member and the second tubular member includes a seal, the seals being adapted to engage one another when the members are connected, whereby a gas tight seal is provided between the first and second threaded members.

20. A threaded connection according to claim 19, wherein each seal is metal, whereby the gas tight seal is a metal-to-metal seal.

21. A threaded connection according to claim 17, further comprising a lubricant disposed between the first tubular member and the second tubular member.

22. A threaded connection according to claim 21, wherein the lubricant is an environmentally friendly lubricant.

23. A threaded connection according to claim 21, wherein the lubricant is a polytetrafluoreethylene-based lubricant, or graphite-based lubricant.

24. A threaded connection according to claim 21, wherein the lubricant is an American Petroleum Industry or American Petroleum Industry-modified lubricant.

25. A threaded connection according to claim 17, wherein each of the first tubular member and the second tubular member are components of oil or gas production equipment.

26. A threaded connection according to claim 17, wherein the alloy prevents galling between the first tubular member and the second tubular member.

27. A threaded connection according to claim 17, wherein the alloy prevents galling between the first tubular member and the second tubular member when breaking a connection between the first tubular member and the second tubular member.

28. A threaded connection comprising:
a first tubular member having a metal thread at each end thereof,
at least part of each thread being coated with an alloy of copper and tin for increasing galling resistance of threaded metal-metal contact points,
said alloy containing 20 wt % to 80 wt % copper, and
the remainder of the alloy comprising tin and optionally up to 2 wt % additives or impurities;
a second tubular member, the second tubular member having a threaded end adapted to engage one of the threaded ends of the first tubular member; and
a third tubular member, the third tubular member having a threaded end adapted to engage the other end of the first tubular member.

29. A threaded connection according to claim 28, wherein the first tubular member includes a torque shoulder adjacent each thread, each torque shoulder being adapted to engage with cooperating torque shoulders on the second and third tubular members.

30. A threaded connection according to claim 28, wherein the first tubular member further comprises a central register disposed between the torque shoulders.

31. A threaded connection according to claim 28, wherein each of the first tubular member and the second tubular member includes a seal, the seals being adapted to engage one another when the members are connected, whereby a gas tight seal is provided between the first and second threaded members.

32. A threaded connection according to claim 31, wherein each seal is metal, whereby the gas tight seal is a metal-to-metal seal.

33. A threaded connection according to claim 28, wherein each of the first tubular member and the third tubular member includes a seal, the seals being adapted to engage one another when the members are connected, whereby a gas tight seal is provided between the first and third threaded members.

34. A threaded connection according to claim 33, wherein each seal is metal, whereby the gas tight seal is a metal-to-metal seal.

35. A threaded connection according to claim 28, further comprising a lubricant disposed between the first tubular member and the second tubular member.

36. A threaded connection according to claim 35, wherein the lubricant is an environmentally friendly lubricant.

37. A threaded connection according to claim 35, wherein the lubricant is a polytetrafluoreethylene-based lubricant, or graphite-based lubricant.

38. A threaded connection according to claim 35, wherein the lubricant is an American Petroleum Industry or American Petroleum Industry-modified lubricant.

39. A threaded connection according to claim 28, further comprising a lubricant disposed between the first tubular member and the third tubular member.

40. A threaded connection according to claim 39, wherein the lubricant is an environmentally friendly lubricant.

41. A threaded connection according to claim 39, wherein the lubricant is a polytetrafluoreethylene-based lubricant, or graphite-based lubricant.

42. A threaded connection according to claim 39, wherein the lubricant is an American Petroleum Industry or American Petroleum Industry-modified lubricant.

43. A threaded connection according to claim 28, wherein each of the first tubular member, the second tubular member, and the third tubular member are components of oil or gas production equipment.

44. A threaded connection according to claim 28, wherein the alloy prevents galling between the first tubular member and the second tubular member and the alloy also prevents galling between the first tubular member and the third tubular member.

45. A threaded connection according to claim 28, wherein the alloy prevents galling between the first tubular member and the second tubular member when breaking a connection between the first tubular member and the second tubular and the alloy also prevents galling between the first tubular member and the third tubular member when breaking a connection between the first tubular member and the third tubular member.

46. A method comprising:

coating an alloy of copper and tin on all or a portion of threaded metal-metal contact points for increasing the galling resistance of the threaded metal-metal contact points of oil and gas tubulars, wherein the alloy comprises 20 wt % to 80 wt % copper, and the remainder of the alloy comprises tin and optionally up to 2 wt % additives or impurities.

47. The method according to claim 46, wherein the alloy comprises 35 wt % to 60 wt % copper.

48. The method according to claim 46, wherein the alloy comprises 40 wt % to 55 wt % copper.

49. The method according to claim 46, wherein the alloy is applied to the threaded metal-metal contact points by electroplating.

50. A method according to claim 46, wherein galling is prevented during the breaking of a connection of the metal-metal contact points.

* * * * *